INVENTOR.
JAMES W. HENDRY

United States Patent Office 3,245,116
Patented Apr. 12, 1966

3,245,116
PLASTIC MOLDING MACHINE
James W. Hendry, Scottsburg, Ind., assignor to Borg-Warner Corporation, Chicago, Ill., a corporation of Illinois
Filed Jan. 23, 1963, Ser. No. 253,482
7 Claims. (Cl. 18—12)

This invention relates to an extrusion apparatus and, more particularly, relates to a screw-type extruder having a plurality of alternately operable, positive feeding devices for feeding plastic material under substantial pressure into the feed end of the extrusion cylinder.

Screw-type extruders commonly have a supply hopper from which the material to be extruded falls by gravity into the feed end of the extrusion cylinder. In some instances feed-assisting devices are used to feed the material into the extrusion chamber, such as a single reciprocable ram or a rotatable feeding screw, but these do little more than move the material from the hopper into the extrusion chamber. Moreover, the use of a single, intermittently reciprocable, feeding ram for feeding purposes provides only an intermittent supply of plastic material to the extruder and this in turn may require that the extruder screw be rotated intermittently or at a slower rate than it might otherwise be possible to achieve. The use of such a feeding screw, on the other hand, involves substantial additional expense and, moreover, it is not possible to achieve, with feeding screws of practical size and moderate cost, a sufficiently rapid feeding rate to insure maximum throughput of the material to be extruded.

The volumetric feeding efficiency of an extrusion screw is relatively low, such as about 20 to 30 percent, and this means that the amount of material which can actually be extruded in a given time period is considerably less than that which is theoretically possible. However, the feeding efficiency of the extrusion screw can be substantially increased if the material is fed to the screw under a pressure which assists the extrusion screw in moving the plastic material through the extrusion chamber. Apparently workers in this field have either failed to realize this or have not used this concept so as to achieve maximum production from a given extruder.

Further, due to the continuous nature of a screw-type extrusion operation, the plasticizing operation performed by the screw is more or less constant so that a given extruder and screw cannot be used according to previous practice to extrude materials having widely different plasticizing requirements. Of course, it is possible to substitute one type of extrusion screw for another in order to obtain a different type of plasticizing operation but this involves substantial expense in stocking a variety of screws for a given extruder and it involves additional expense and loss of production time in changing over from one screw to another. Accordingly, there exists a need for a screw-type extrusion apparatus which is capable of modifying the nature and extent of the plasticizing operation without requiring that the screw be changed except for substantial changes in operating requirements.

Accordingly, the objects of the invention include the following:

(1) To provide a screw-type extrusion apparatus which is capable of continuously producing an extruded product at a high production rate.

(2) To provide an apparatus, as aforesaid, which is capable of plasticizing the material rapidly and without causing degradation of the material within the machine.

(3) To provide an apparatus, as aforesaid, in which the material is supplied to the extrusion cylinder by alternately operable feeding units, the material being substantially continuously fed into the extrusion cylinder.

(4) To provide an apparatus, as aforesaid, in which each of the feeding units is capable not only of supplying material to the extrusion cylinder but also is capable of assisting the extrusion screw in moving the material through the cylinder whereby a high volumetric feeding efficiency is provided.

(5) To provide an apparatus, as aforesaid, in which the nature and duration of the plasticizing operation is adjustable within at least narrow limits so as to minimize the necessity for changing the screw when the machine is used on different kinds of plastic material.

Additional objects and advantages of the invention will become apparent to those acquainted with processes and apparatuses of this type upon reading the following description and inspecting the accompanying drawings.

GENERAL DESCRIPTION

The purpose of the apparatus is to provide means for extruding plastic materials in which feeding pressures are successively applied onto quantities of plastic materials in a plurality of feeding zones and said quantities are then conducted under such pressures successively into and through the extrusion cylinder. At least one feeding pressure is applied at all times so that the material to be extruded is continuously fed under pressure into and through the extrusion cylinder. As the material passes through the extrusion cylinder, a screw continuously rotates in the cylinder in order to plasticize the material and impose an additional pressure thereon which is effective for continuously extruding the plastic material through the extrusion die.

According to the structural aspects of the invention, there is provided an extrusion apparatus having an extrusion cylinder with a rotatable extrusion screw therewithin. Two or more feeding units are connected to the extrusion cylinder for successively feeding plastic material thereinto. Suitable control means are provided for controlling the operation of the feeding units so that a substantially continuous supply of material is made available to the extrusion cylinder. Preferably, each feeding unit has a valve therewithin which is open only when the feeding unit with which it is associated is supplying the material to the extrusion cylinder.

DETAILED DESCRIPTION

The invention will be most easily understood by considering the accompanying drawings.

Figure 1:
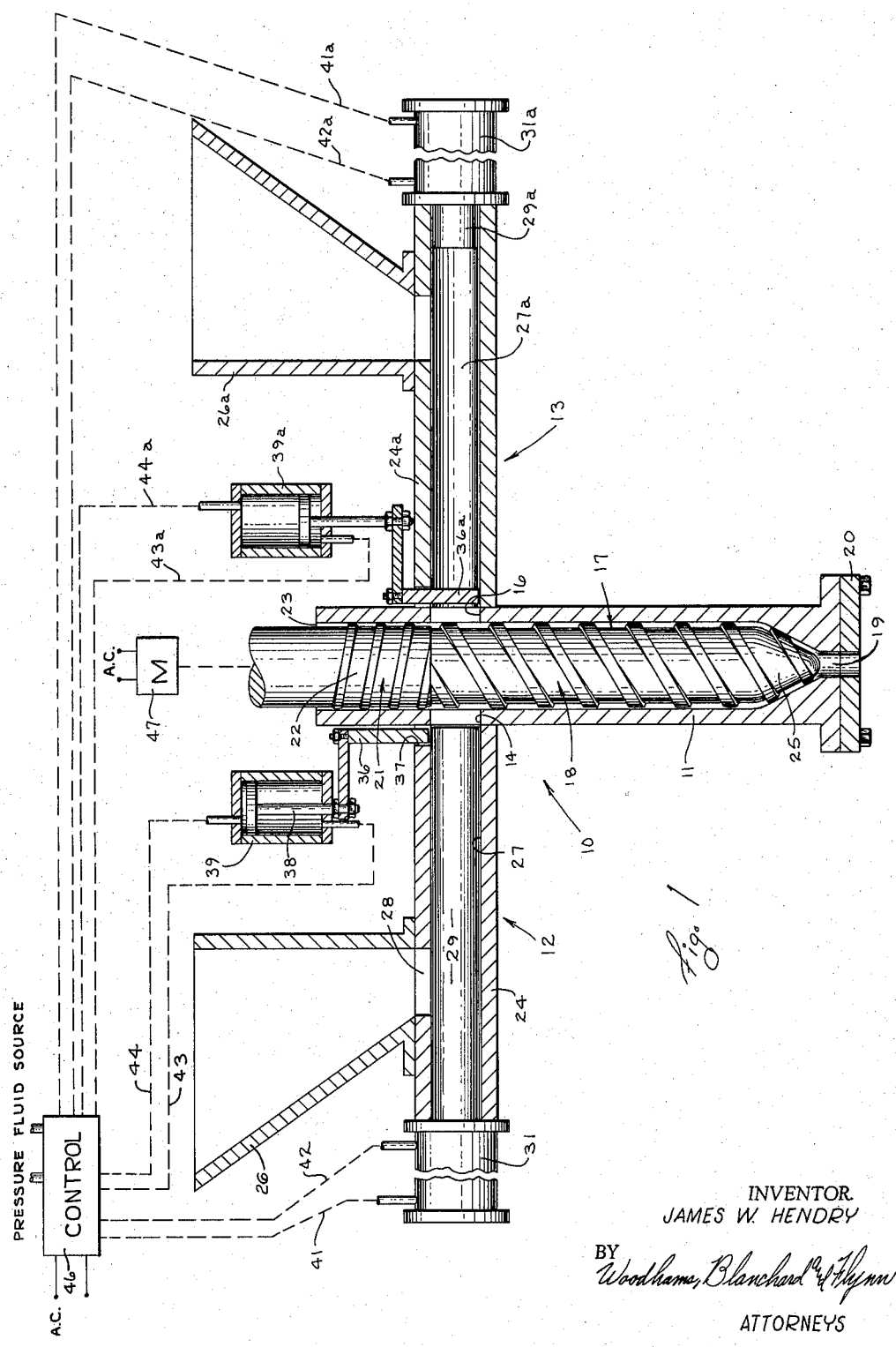
FIGURE 1 is a schematic view, partially in central section and partially broken, of apparatus embodying the invention.

Referring to FIGURE 1, there is shown an extrusion apparatus 10 which is comprised of an extrusion cylinder 11 and a plurality of feeding units, two such units 12 and 13 being shown, for supplying plastic material to said extrusion cylinder. The extrusion cylinder 11 has a pair of inlet openings 14 and 16 which are close to but spaced from the supply end thereof and which communicate with the feeding units 12 and 13 as further described hereinbelow.

An extrusion screw 17 is mounted in the cylinder 11 for rotation with respect thereto. The screw 17 has a threaded portion 18 extending from adjacent the inlet openings 14 and 16 to the discharge end of the screw, the threads of the threaded portion 18 being disposed so that rotation of the screw forces the plastic material through the cylinder 11 and thence through the outlet opening 19 in the extrusion die 20 which is secured to the discharge end of the extrusion cylinder 11. The extrusion screw 17 may include also a portion 21 having shallow grooves 22, therein, said grooves being of opposite hand with respect to the threads of the threaded portion 18 and sufficiently shallow that the passage of plastic material therethrough will not be excessive. Thus, rotation of the screw will effect movement of almost all of the plastic material entering the inlet openings 14 and 16 toward the outlet opening 19; however, a small quantity of said material will pass through the grooves 22 in the opposite direction and this material will pass out from the cylinder 11 through the open upper end 23 thereof. This latter quantity of material serves to lubricate the screw as is described in greater detail in copending application of James W. Hendry, Serial No. 194,274, filed May 14, 1962.

The configuration of the threaded portion 18 of the screw 17 can be of a variety of different shapes, the threaded portion 18 here shown for illustrative purposes being of a relatively simple configuration in having a constant pitch and constant diameter throughout its length, except for a converging terminal portion 25 thereon. However, it will be appreciated that other screw configurations can be used without departing from the scope of this invention.

The feeding units 12 and 13 are substantially identical, hence, only unit 12 will be described in detail herein and such description will be understood to apply also to the unit 13. The parts of feeding unit 13 corresponding to those of feeding unit 12 are identified by the same reference numerals with the suffix "a" added thereto.

The feeding unit 12 comprises a feeding cylinder 24 which is supported upon a base (not shown) of any suitable type. A material feeding device, such as a hopper 26, is mounted on the feeding cylinder 24 adjacent its outer end and said hopper communicates with the central chamber 27 in said feeding cylinder through a feed opening 28 in the side wall thereof. A ram 29 is arranged for reciprocation within the feeding cylinder 24 between a position located outwardly (leftwardly as appearing in FIGURE 1) of the feed opening 28 and the position as shown close to the inlet opening 14 of the extrusion cylinder 11. The ram 29 can be reciprocated in any convenient manner such as by the pressure fluid cylinder 31.

A valve 36 is mounted on the feed cylinder 24 for reciprocation in a direction transverse to the longitudinal axis of said feed cylinder through an opening 37 in the side wall thereof, said opening being provided at the inner axial end of the feeding cylinder 24 and adjacent to the inlet opening 14. The valve 36 is connected to a piston rod 38 which is reciprocable within a cylinder 39 whereby said valve can be moved between a position where it blocks communication between the feeding cylinder 24 and the extrusion cylinder 11 and a position wherein said cylinders are in free communication.

The pressure fluid supply conduits 41–44 and 41a–44a leading to the cylinders 31, 39, 31a and 39a are connected to a suitable control 46 which is in turn connected to a suitable source of pressure fluid and, usually, to a source of electrical power, and serves in any conventional manner to control the application of fluid pressure to said conduits in proper timed relationship as further described in greater detail hereinafter. The extrusion screw 17 is driven by motor 47 and, in the customary type of operation, will be continuously rotated thereby.

Figure 3:
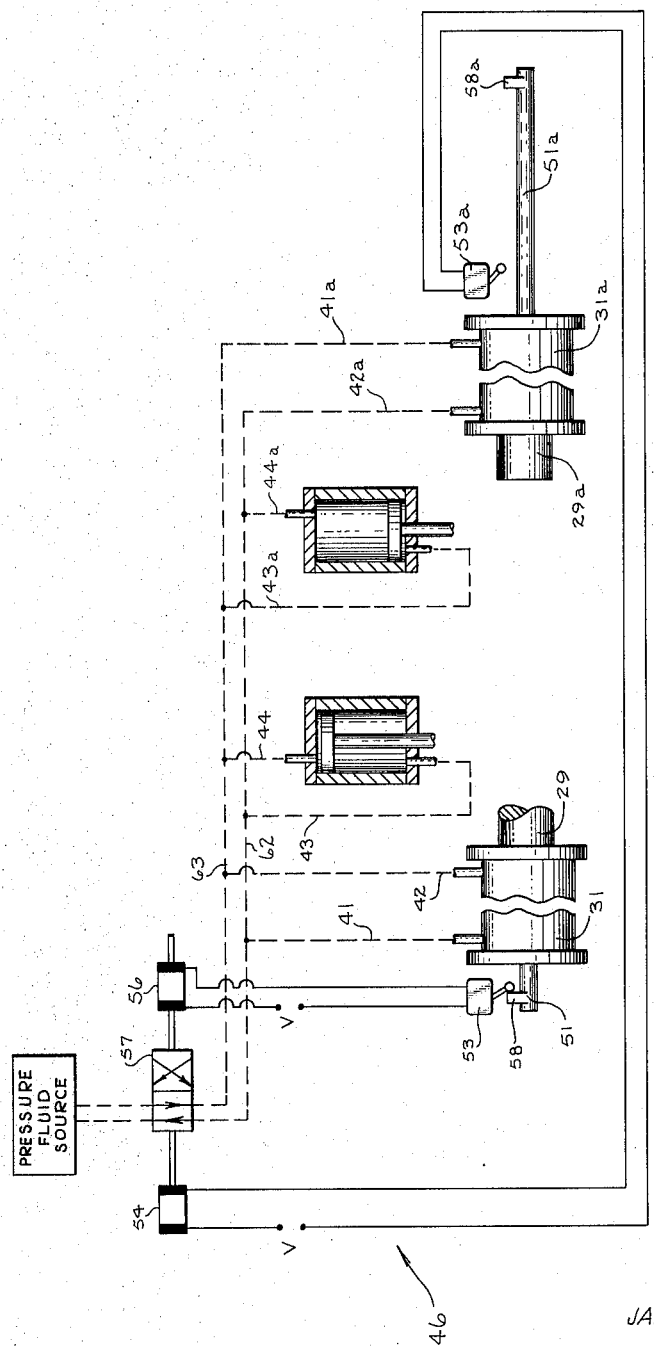
FIGURE 3 is a schematic view of a control system for the apparatus of FIGURE 1.

FIGURE 3 discloses, for purposes of illustration, one particular example of a control system 46 for controlling the operation of fluid pressure to the cylinders 31, 31a, 39 and 39a in proper timed relationship. In this example, the pressure fluid source feeds a two-position, reversing valve 57 to the output sides of which are connected fluid lines 63 and 62. The line 63 feeds the fluid lines 42, 44, 43a and 41a which are connected to one end of each of the respective cylinders 31, 39, 39a and 31a, respectively, as hereinabove described. The line 62 feeds the lines 41, 43, 44a and 42a which are connected to the other end of each of the above cylinders as previously described.

A pair of solenoids 54 and 56 are mechanically connected to the valve 57 to reciprocate same and thereby reverse the flow of pressure fluid between the lines 63 and 62. The solenoids 54 and 56 are connected in series with a suitable source of operating potential indicated at V. Said operating potential may be obtained from the A.C. operating voltage indicated in FIGURE 1 by any convenient means not shown. The solenoids 54 and 56 also are in series with on-off switches 53 and 53a, respectively, which are preferably biased in their open, or off, position. The pressure fluid cylinders 31 and 31a are shown in FIGURE 3 as having extension rods 51 and 51a, respectively, extending through the outwardly facing end walls thereof. The rod 51 is fixed to the ram 29 in any convenient manner, not shown, for reciprocation therewith and the rod 51a is similarly fixed to the ram 29a. The rod 51 has an actuator block 58 fixed thereto for operating the switch 53 and the rod 51a has a block 58a fixed thereto for operating the switch 53a in a manner hereinbelow described.

OPERATION

The operation of the apparatus has been briefly indicated before but the same will be further described in the following paragraphs in order to insure a complete understanding of the invention.

During a given cycle of operation of the extruder, the screw 17 is continuously rotated so that the plastic material continuously exits through the outlet opening 19. Material is alternately supplied to the inlet openings 14 and 16 of the extrusion cylinder 11 by the feeding units 12 and 13 and the feeding operation is so carried out that when one feeding unit has completed its feeding operation, the other unit immediately commences its feeding operation so that a substantially continuous feeding of material to the extrusion cylinder will be effected. The material fed by the feeding units 12 and 13 may be in an unplasticized condition or, in appropriate cases, it may be in a preheated, but not fully plasticized condition.

Referring in greater detail to the operation of the feeding unit 12, when the ram 29 is in its retracted position, the valve 36 is disposed within the feeding cylinder 24 and blocks off communication between said feeding cylinder and extrusion cylinder 11. The plastic material in the hopper 26 falls by gravity into the feeding cylinder 24. It has been found that merely allowing a quantity of material to fall by gravity into the cylinder is sufficiently accurate for most extrusion operations. If greater precision in this regard is desired or required, the hopper structure 26 can be equipped with volumetric or weigh feeding devices (not shown) of any conventional type to insure that a precisely measured charge is deposited in the feeding cylinder 24. When it is time to forward the material from the feeding cylinder 24 into the extrusion cylinder 11, the valve 36 is moved to its outer position and the ram 29 is advanced so that the charge is moved from the feeding cylinder 24 into the extrusion cylinder 11 under pressure. It is to be noted that it may and usually will take an appreciable period of time before the entirety of the charge can be moved into the extrusion cylinder because the space immediately available in the extrusion cylinder for receiving the charge will be substantially less than the volume of the charge itself. During this time interval a charge of material is placed in the feeding unit 13 to make it ready for a subsequent feeding operation. As the screw continues to rotate and the material is discharged through the opening 19, more space becomes available and eventually the entirety of the charge will be moved into the extrusion cylinder. Pressure is continuously exerted on the ram 29 and thereby on the charge of material so that the feeding will proceed as rapidly as possible. Further, the continuous maintenance of the feeding pressure, which may be substantial, has additional significance as will be pointed out hereinbelow.

While the foregoing operation is being carried out, the feeding unit 13 is operating in like fashion except while the feeding unit 12 is being loaded with another charge of plastic material, the feeding unit 13 is feeding its previously loaded charge into the extrusion cylinder 11 and vice versa. Thus, when the valve 36 is closed and the ram 29 is being retracted or is in a retracted position, the valve 36a is open and the ram 29a is being advanced to feed the plastic material into the extrusion cylinder. The control 46 insures that the desired operation of the valves 36 and 36a and the rams 29 and 29a will be achieved.

When the valve 36 or valve 36a of one feeding unit is closed, such prevents the material being fed by the other feeding unit from passing around the screw and entering said one feeding unit. Thus, when either ram 29 or ram 29a is being advanced, the pressure exerted thereby on the material is continuously maintained and confined so that it acts only to forward the material through the extrusion cylinder.

The control device of FIGURE 3 may be utilized, if desired, to obtain the above-mentioned operation. When the ram 29 reaches its position shown in FIGURES 1 and 3, the actuating block 58 on the extension 51 will close the switch 53 to energize the solenoid 56 and move the core of the valve 57 rightwardly to its position as shown. The pressure fluid source will then feed the line 63 and the lines 42, 44, 43a and 41a extending therefrom causing the ram 29 to retract, the valve 36 to close, the valve 36a to open, and the ram 29a to advance. Pressure fluid exiting from the pressure fluid cylinder is carried by the line 62 back to the source. Said valves will act much more quickly than the advancing one of said rams because of the restraining effect of the plastic material on said advancing ram and said valves will therefore be properly positioned as the ram 29a begins its advance. However, the phasing of the valves with respect to the advancing rams may be further adjusted if desired through any convenient and conventional means, such as the employment of flow restrictors (not shown) in the feed lines or variation of pressure cylinder sizes. As the ram 29 retracts the block 58 disengages the switch 53 and therefore deenergizes the solenoid 56 but the valve 57 remains in its position as shown and the action continues.

When the ram 29a has fully advanced, the block 58a closes the switch 53a to energize the solenoid 54 and move the core of the valve 57 leftwardly from its position shown in FIGURE 3. The flow to the lines 63 and 62 is thus reversed whereby the line 62 is supplied with pressure fluid from the pressure fluid source and the line 63 acts as the exhaust return line. Thus, the ram 29 is caused to extend, the valve 36 to open, the valve 36a to close, and the ram 29a to retract and the elements are returned to their positions shown in FIGURES 1 and 3 to complete a full cycle of operation. The apparatus will recycle until the potential source V is removed.

An additional important advantage of the invention is that when either the ram 29 or the ram 29a is being advanced, the pressure exerted thereby on the plastic material is effective not only on the material in the feeding cylinder but also on the material passing through the extrusion cylinder 11. This desirable result is achieved by suitable control over the size of the cylinders 31 and 31a and the value of the pressure of the fluid supplied thereto. As the result, the material within the extrusion cylinder 11 will move faster than it would if only the extrusion screw 17 were used to forward the material through the extrusion cylinder. As previously noted, an extrusion screw has a relatively low-volumetric efficiency of feeding because of slippage between the surface of the screw and the plastic material as the screw rotates, due to back pressure and other effects. The pressure exerted by the rams 29 and 29a retards and in appropriate cases may overcome this slipping so that the apparent volumetric feeding efficiency of the screw can be much higher and may even exceed 100 percent. At the same time the plasticizing of the material by the screw 17 proceeds at a rapid rate so that the material is effectively plasticized in a short period of time. Furthermore, the plasticizing of the material can be closely controlled by adjusting the rate and direction of rotation of the screw, and by controlling the pressure applied on the rams 29 and 29a, whereby a wide variety of materials can be effectively handled by a single apparatus.

The feeding cylinders 24 and 24a are smooth bored and the rams 29 and 29a fit closely therewithin. Further, the inlet openings 14 and 16 are of substantially the same diameter as the central chambers 27. Also, the screw 17 is in a close running fit with the internal wall of the extrusion cylinder 11. These features insure that no pockets or dead spaces, where plastic material might accumulate, are present within the apparatus. Hence, all of the material flows smoothly and uniformly through the extrusion apparatus so that it cannot become heat damaged which would detrimentally affect the quality of the extruded product.

Suitable control over the operation of the rams will minimize or eliminate any possible interruption in feeding during the transition between the feeding operation of one feeding unit and the feeding operation of another unit. For example, after a charge of material is placed in one of the feeding cylinders, the ram therein can be pressurized in order to form the charge into a compact mass which is held against the valve, which at this time is closed. As soon as the feeding operation of the other feeding unit is finished, the valve can be opened so that the charge of material is immediately available for entry into the extrusion cylinder. In appropriate cases, the control 46 can be arranged so that the feeding operations for two feeding units can overlap to a slight extent so that while one feeding unit is finishing its feeding operation, the other feeding unit is beginning its feeding operation. In this fashion a continuous supply of material to the extrusion cylinder 17 can be assured. However, even if some interruption does occur, it will be harmless providing only that the extent thereof is not great.

MODIFICATION

Figure 2:
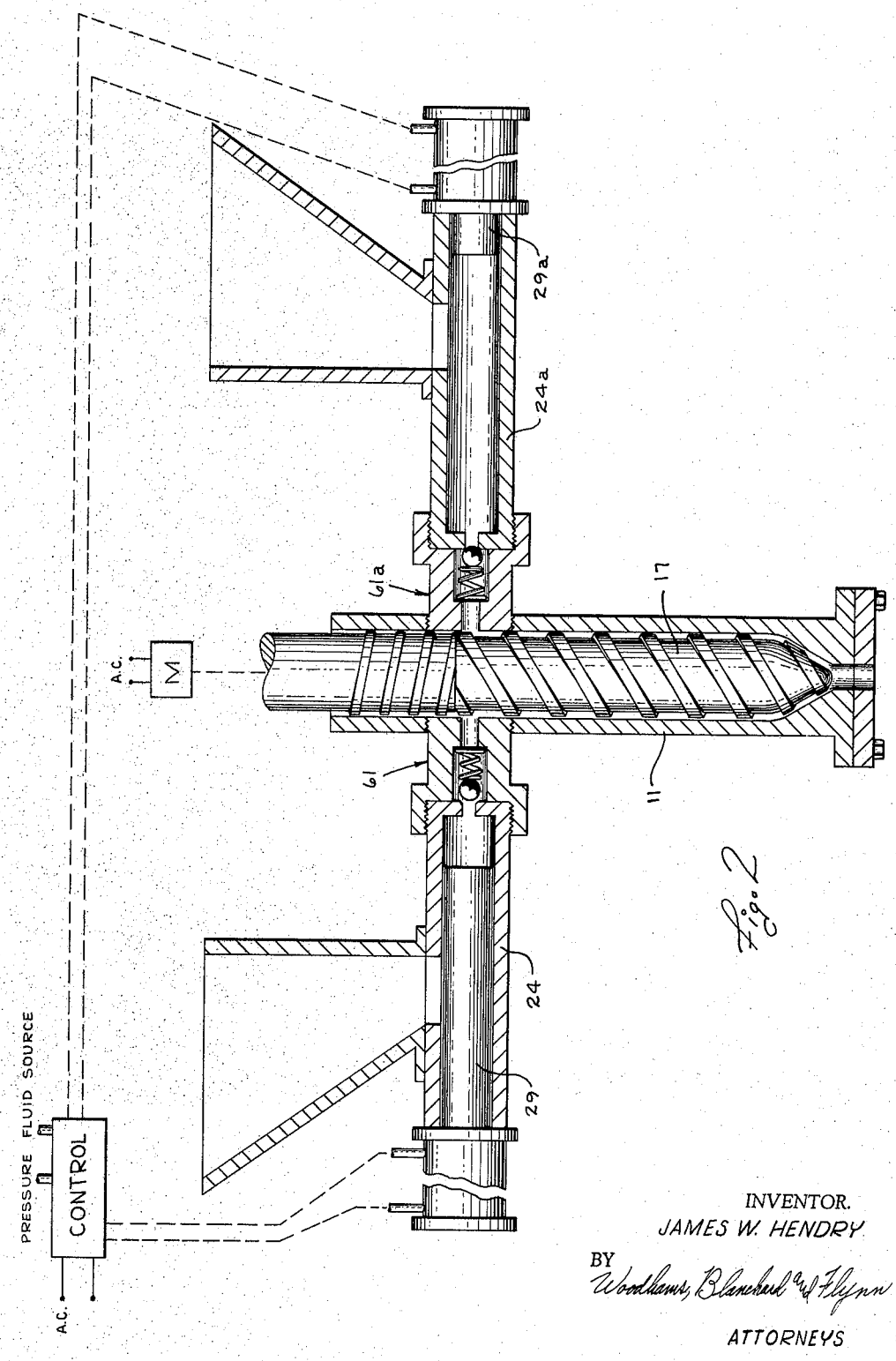
FIGURE 2 is a schematic view similar to FIGURE 1 and showing a modification.

FIGURE 2 illustrates a modification which in most respects is identical with the embodiment previously described. Accordingly, the same reference numerals are used to identify parts identical with those in the previously described embodiment.

Here, however, spring-urged, ball-type check valves 61 and 61a are used in place of the valves 36 and 36a in the previously described embodiment and their associated cylinders 39 and 39a and conduits 43, 44, 43a and 44a. These valves 61 and 61a open automatically when their respectively associated rams are moved in the feeding direction and they will automatically close when the pressure on the feeding rams is released. Further, the closing of the check valve in any unit will be further enhanced by pressure exerted on the ball thereof when the ram in the other feeding unit is moved in a feeding direction.

While this embodiment is mechanically simpler than the previously described embodiment, it is less desirable because of the greater pressure drops which exist across the check valves and because there is a greater opportunity for material to hang up, it will not move as smoothly and continuously through the apparatus and cleaning will be more difficult. In all other respects, the operation construction of this embodiment will be the same as in the previously described embodiment. Hence, further description thereof is believed to be unnecessary.

While particular preferred embodiments of the invention have been described, the invention contemplates such changes or modifications therein as lie within the scope of the appended claims.

What is claimed is:

1. An extrusion apparatus, comprising:
   an extrusion cylinder;
   an extrusion screw located within said extrusion cylinder;
   means for rotating said extrusion screw;
   a plurality of feeding units communicating with said extrusion cylinder at points spaced substantially the same distance from the discharge end of the cylinder, each feeding unit comprising a feeding cylinder, a reciprocable ram therein and means for reciprocating said ram whereby plastic material can be fed into said extrusion cylinder under pressure from each of said feeding units and the material from each feeding unit will be substantially equally plasticized by said extrusion screw;
   valve means in each of said feeding units at the end thereof adjacent to said extrusion cylinder for closing off communication between said feeding units and said extrusion cylinder each said valve means being operable in relation to its associated ram so that said valve means is open when its associated ram is being advanced;
   control means for effecting successive reciprocation of said rams in order to feed plastic material from said feeding units in succession into said extrusion cylinder.

2. An extrusion apparatus according to claim 1, wherein said means for reciprocating said ram includes a first fluid pressure operated means and wherein said valve means is operated by second fluid pressure operated means, said control means controlling the supply of fluid pressure to said first and second fluid pressure operated means.

3. An extrusion apparatus according to claim 1, in which said valve means comprises a normally closed check valve which is automatically opened when its associated ram is advanced.

4. An extrusion apparatus according to claim 1, in which each of said feeding units communicates with said extrusion cylinder through an opening in the side wall of said cylinder, said opening being substantially as large as the bore of said feeding cylinder.

5. An extrusion apparatus according to claim 1, in which said extrusion screw consists of two threaded sections of opposite hand, one of said threaded sections extending from the discharge end of said screw to said feeding units and the other threaded section extending from said feeding units to the other end of said screw, said other threaded section having a substantially smaller volumetric capacity than said one threaded section whereby on rotation of said screw the major portion of the plastic material will be fed toward said discharge end and a minor portion of the material will be fed toward the other end of said screw to serve as a lubricant for said screw.

6. An extrusion apparatus comprising:
   an extrusion cylinder;
   an extrusion screw located within and coaxial with said extrusion cylinder;
   drive means for rotating said extrusion screw;
   a pair of opposed feeding units communicating with said extrusion cylinder and spaced equal distances from the discharge end thereof, each feeding unit comprising a feeding cylinder extending transversely to the longitudinal axis of the extrusion screw and a concentric reciprocable ram therein whereby plastic material can be fed into said extrusion cylinder under pressure from each of said feeding units and the material from each feeding unit will be substantially equally plasticized by said extrusion screw;
   valve means between each of said feeding units and said extrusion cylinder for closing off communication between said feeding units and said extrusion cylinder, each said valve means comprising a reciprocable gate which is slidable transverse to the longitudinal axis of its respective one of said feeding cylinders;
   fluid pressure cylinders for operating said rams and said valve means;
   a source of pressure fluid for supplying said pressure fluid cylinders;
   control means for controlling supply of pressure fluid to said cylinders including means for moving each gate to its open position when its associated ram is moving toward said extrusion cylinder and means to move said gate to its closed position when the other ram is moving toward said extrusion cylinder.

7. An extrusion apparatus comprising:
   an extrusion cylinder;
   an extrusion screw located within and coaxial with said extrusion cylinder;
   drive means for rotating said extrusion screw;
   a pair of opposed feeding units communicating with said extrusion cylinder and spaced equal distances from the discharge end thereof, each feeding unit comprising a feeding cylinder extending transversely to the longitudinal axis of the extrusion screw and a concentric reciprocable ram therein whereby plastic material can be fed into said extrusion cylinder under pressure from each of said feeding units and the material from each feeding unit will be substantially equally plasticized by said extrusion screw;
   valve means between each of said feeding units and said extrusion cylinder for closing off communication between said feeding units and said extrusion cylinder, each of said valve means comprising a reciprocable gate which is slidable transverse to the longitudinal axis of its respective one of said feeding cylinders, said rams and the gates respectively associated therewith being so related and positioned with respect to each other as to place said rams in their fully extended positions as close to the screw as possible;
   fluid pressure cylinders for operating said rams and said valve means;
   a source of pressure fluid for supplying said pressure fluid cylinders;
   control means for controlling supply of pressure fluid to said cylinders, said control means being responsive to the respective positions of successive ones of said rams with respect to said gates for alternately reversing said rams and alternately changing the position of said gates, an advancing ram being associated with an open gate and a retracting ram being associated with a closed gate.

References Cited by the Examiner

UNITED STATES PATENTS

| | | | |
|---|---|---|---|
| 1,156,096 | 10/1915 | Price | 264—176 |
| 2,253,810 | 8/1941 | Poux | 18—30 |
| 2,437,460 | 3/1948 | De Francisci | 18—12 XR |
| 2,838,793 | 6/1958 | Scott et al. | 18—12 |
| 2,964,177 | 12/1960 | Scribner | 18—12 |

FOREIGN PATENTS 526,027   5/1955   Italy.

ROBERT F. WHITE, *Primary Examiner.*

ALEXANDER H. BRODMERKEL, *Examiner.*